UNITED STATES PATENT OFFICE.

LANSING E. HOPKINS, OF BROOKLYN, NEW YORK.

IMPROVEMENT IN FELTING COMPOUNDS.

Specification forming part of Letters Patent No. 15,563, dated August 19, 1856.

*To all whom it may concern:*

Be it known that I, LANSING E. HOPKINS, of Brooklyn, in the county of Kings and State of New York, have invented a new and useful Improvement in the Art of Felting; and I do hereby declare the following to be a full, clear, and exact description of the same.

My invention consists in the application of saponaceous and ammoniacal substances in water, to the wetting or saturating of hat-bodies and other articles of fur, wool, &c., in the process of felting, which substances I use in either hot or cold water, in the following manner: In one gallon of water I dissolve one pound of what is known in the market as "soda soap," and the solution, when complete, will be about the consistency of soft soap, and I designate it "Saponaceous Solution." If the water be warm, the dissolving of the soap will be facilitated. This saponaceous solution I use in the proportion of one to three parts of soft water, (warm or cold,) instead of hot water, hot water and acid, &c., heretofore used, for the purpose of wetting and saturating from time to time the article to be felted, while the same is crozed, worked, or manipulated in any usual or convenient way.

Having prepared the water as above, in a tub, vat, or other suitable vessel, I take a hat-body or other article to be felted, and croze or roll it up, and, dipping or placing it within the prepared liquid, give it the requird working and manipulation for a sufficient time, when it is again crozed or rolled up in the usual manner and again dipped or placed in the prepared liquid and the working and manipulation repeated as before, and so on until the article is sufficiently felted. The saponaceous matter causes the article being felted to contract and come in much more rapidly than by any other known means; but the felt will be somewhat thick and spongy, and requiring to be made more compact and hard, to effect which, when the article being felted is reduced or brought into nearly its proper size or desired condition, I add to the liquid in the tub or vat spirits of ammonia in the proportion of one ounce to five galllons of the liquid, and continue the process of crozing, manipulation, &c., as before, until the felting be completed. The ammonia so added will at once reduce the sponginess and bring the felt down into a thin, firm, and compact state.

Although I have set forth above specific proportions and quantities of the saponaceous and ammoniacal substances to be used and indicated a manner of using them in the process of felting, yet I would remark that it is not possible to limit or fix precise proportions or quantities of either to be used, for I find that any appreciable quantity will be more or less useful, respectively, and at any time during the process of felting. Thus in the earlier stage of the felting the prepared liquid in the tub or vat may deteriorate and become weakened from the character of material being felted or by the water being more or less hard, or from some other cause, in which case the felting will be slower, and then it will be well to add to the liquid a small quantity of the saponaceous solution. So, likewise, when the ammonia is being used, its effect upon the felt may be lessened and become insufficient by evaporation of the ammonia (and particularly so if warm water be used) or by the character of the material being felted, (for different kinds of wool and furs require different quantities of ammonia,) and in that event it will be of service to add a little more of the ammonia to the liquid, and whether more or less may be required can be determined by mere inspection during the felting, for if the article felts down readily, becoming thinner and more compact with sufficient facility, enough ammonia has been used; but if the felt remain spongy, then more will be beneficial. This test will answer in all cases, and is perhaps the only one that can positively or safely be given. Aside, however, from these possible contingencies, the proportions and quantities and manner of use first set forth above may be relied on to effect a rapid and superior felt.

By the use of the materials above mentioned in the process of felting is greatly facilitated, and their use enables me to felt in cold water (which has never to my knowledge heretofore been done) in a good, satisfactory, and expeditious manner.

What I claim in the process of felting, and desire to secure by Letters Patent, is—

Keeping the articles to be felted constantly saturated with or immersed in a solution of saponaceous matter during the operation of felting, and near the close of the operation adding to said solution a small quantity of ammoniacal matter, substantially as set forth.

LANSING E. HOPKINS.

Witnesses:
J. L. KINGSLER,
JOHN N. PATSON.